(12) United States Patent
Iwade et al.

(10) Patent No.: US 11,667,092 B2
(45) Date of Patent: Jun. 6, 2023

(54) SHEET METAL MEMBER FORMING METHOD AND SHEET METAL MEMBER FORMING DEVICE

(71) Applicant: TORAY ENGINEERING CO., LTD., Tokyo (JP)

(72) Inventors: Takashi Iwade, Kyoto (JP); Jun Inagaki, Otsu (JP); Toshifumi Takegami, Otsu (JP)

(73) Assignee: TORAY ENGINEERING CO., LTD., Tokyo (JP)

( * ) Notice: Subject to any disclaimer, the term of this patent is extended or adjusted under 35 U.S.C. 154(b) by 59 days.

(21) Appl. No.: 17/606,127

(22) PCT Filed: May 12, 2020

(86) PCT No.: PCT/JP2020/019022
§ 371 (c)(1),
(2) Date: Oct. 25, 2021

(87) PCT Pub. No.: WO2020/230797
PCT Pub. Date: Nov. 19, 2020

(65) Prior Publication Data
US 2022/0203635 A1 Jun. 30, 2022

(30) Foreign Application Priority Data
May 14, 2019 (JP) ............................. JP2019-091413

(51) Int. Cl.
*B21D 47/04* (2006.01)
*B29C 70/68* (2006.01)
(Continued)

(52) U.S. Cl.
CPC .............. *B29C 70/68* (2013.01); *B21D 22/20* (2013.01); *B21D 47/04* (2013.01); *B29C 70/30* (2013.01); *B29K 2101/10* (2013.01); *B29K 2307/04* (2013.01); *B29K 2705/12* (2013.01); *B29L 2031/30* (2013.01)

(58) Field of Classification Search
CPC ............................... B21D 47/04; B29C 70/68
See application file for complete search history.

(56) References Cited

U.S. PATENT DOCUMENTS

2017/0313000 A1 11/2017 Licko et al.

FOREIGN PATENT DOCUMENTS

DE 102011120340 A1 * 6/2013
DE 102015008667 A1 * 1/2016
(Continued)

OTHER PUBLICATIONS

International Search Report of the corresponding International Application No. PCT/JP2020/019022, dated Jul. 14, 2020.

*Primary Examiner* — Jeffry H Aftergut
(74) *Attorney, Agent, or Firm* — Global IP Counselors, LLP (57) ABSTRACT

A sheet metal member forming method comprises placing a fiber bundle of a predetermined length, via a thermosetting resin, in a predetermined position on a surface of a sheet metal member, forming a coating film on at least a part of the sheet metal member after the placing of the fiber bundle, and while heating and drying the coating film, heat-curing the thermosetting resin to bond the fiber bundle to the sheet metal member.

20 Claims, 6 Drawing Sheets

(51) Int. Cl.
*B21D 22/20* (2006.01)
*B29C 70/30* (2006.01)
*B29K 101/10* (2006.01)
*B29K 307/04* (2006.01)
*B29K 705/12* (2006.01)
*B29L 31/30* (2006.01)

(56) References Cited

FOREIGN PATENT DOCUMENTS

| | | | |
|---|---|---|---|
| JP | 49-26945 B1 | 7/1974 | |
| JP | 2003-129611 A | 5/2003 | |
| JP | 2013-212605 A | 10/2013 | |
| JP | 2018-8409 A | 1/2018 | |
| WO | 2016/129360 A1 | 8/2016 | |
| WO | WO-2018/124215 A1 * | 7/2018 | |

* cited by examiner

SHEET METAL MEMBER FORMING METHOD AND SHEET METAL MEMBER FORMING DEVICE

CROSS-REFERENCE TO RELATED APPLICATIONS

This application is a U.S. National stage of International Application No. PCT/JP2020/019022 filed on May 12, 2020. This application claims priority to Japanese Patent Application No. 2019-091413 filed on May 14, 2019 with Japan Patent Office. The entire disclosure of Japanese Patent Application No. 2019-091413 is hereby incorporated herein by reference.

BACKGROUND

Field of the Invention

The present invention relates to a sheet metal member forming method and a sheet metal member forming device for forming by placing a fiber bundle on a surface of a sheet metal member.

Background Information

Conventionally, a thin sheet of steel plate, such as 0.6 mm to 0.8 mm, is used for sheet metal members used in automobile bodies, for example, for the purpose of weight reduction. A method of achieving light weight and high strength by attaching a fiber bundle such as carbon fiber to the thin sheet to reinforce it has been proposed.

To attach the fiber bundle to the sheet metal member, resin is generally used, and a fiber bundle impregnated with a thermosetting resin such as epoxy, also called prepreg, is placed on the surface of the sheet metal member, and then heated to cure the thermosetting resin and bond the fiber bundle to the sheet metal member.

SUMMARY

However, there has been a problem in production efficiency in using a formed article in which the sheet metal member is reinforced with the fiber bundle as described above for automotive applications. Specifically, in attaching the fiber bundle to the conventional automotive parts, the processes of attaching and heat-curing of the fiber bundle are added to the conventional processes as described above. In particular, when there is a risk of the fiber bundle peeling off from the sheet metal member in the middle of curing the thermosetting resin, a method called autoclave is used in which the surrounding environment of the sheet metal member and the fiber bundle is made into a vacuum environment and then heated, which requires several hours. For this reason, it has been difficult to apply the method of reinforcing the sheet metal member with the fiber bundle to applications that require mass production of the member, such as automotive applications.

In addition, when the sheet metal member after forming has a complex shape, it has been difficult to attach the fiber bundle to the surface having the complex shape. Also, when the sheet metal member after forming has a recess, it has been difficult to attach the fiber bundle to the inner surface of the recess.

The present disclosure has been made in consideration of the above-described problems, and it is an object of the present disclosure to provide a sheet metal member forming method and a sheet metal member forming device capable of efficiently reinforcing a sheet metal member, reducing the overall weight of the sheet metal member, and forming the sheet metal member into complex shapes.

In order to solve the above problem, the sheet metal member forming method of the present disclosure is characterized in that, after a placement process in which a fiber bundle of a predetermined length is placed, via a thermosetting resin, in a predetermined position on a surface of a sheet metal member, a coating film is formed on at least a part of the sheet metal member by a coating process, and, in a heating and drying process of the coating film, the thermosetting resin is heat-cured as well to bond the fiber bundle to the sheet metal member.

With the sheet metal member forming method of the present disclosure, the sheet metal member is efficiently reinforced. Specifically, in the heating and drying process, the drying of the coating film and the heat-curing of the thermosetting resin are performed simultaneously, thereby simplifying the process and making it more efficient.

Here, at least a part of the thermosetting resin can be pre-impregnated in the fiber bundle.

Also, at least the part of the thermosetting resin can be separately supplied as an adhesive material in the placement process.

Between the placement process and the coating process, a press forming of the sheet metal member on which the fiber bundle is placed can be performed by a pressing process subsequent to the placement process.

In this way, the fiber bundle can be easily placed even when the shape of the sheet metal member after the pressing process is a shape that is difficult to place the fiber bundle.

Also, the placement process and the subsequent pressing process can be repeated a plurality of times to sequentially perform the press forming of the sheet metal member.

In this way, it is possible to form the sheet metal member into complex shapes.

It is also preferable that the predetermined position is located in a non-deformed area in the press forming in the pressing process.

In this way, it is possible to prevent the fiber bundle from being peeled off from the sheet metal member.

Before the heating and drying process, a second sheet metal member can be superimposed on the sheet metal member on which the fiber bundle is placed so as to sandwich the fiber bundle.

In this way, it is possible to prevent the fiber bundle from being peeled off the sheet metal member.

In the placement process, at least one of the fiber bundle and the sheet metal member at least in the vicinity of the predetermined position can be heated to a temperature below a curing temperature of the thermosetting resin.

In this way, the thermosetting resin is softened and also the stiffness of the fiber bundle is reduced to conform with the surface shape of the sheet metal member.

The fiber bundle can also include carbon fibers.

The adhesive material can also include carbon fibers.

In this way, the adhesive layer itself can be strengthened.

Also, in order to solve the above problem, a sheet metal member forming device of the present disclosure is characterized in that it performs any one of the sheet metal member forming methods mentioned above.

With the sheet metal member forming device of the present disclosure, the sheet metal member is efficiently reinforced. Specifically, in the heating and drying process by the sheet metal member forming device, the drying of the coating film and the heat-curing of the thermosetting resin are performed simultaneously, thereby simplifying the process and making it more efficient.

The sheet metal member forming method and the sheet metal member forming device of the present disclosure are capable of efficiently reinforcing the sheet metal member, reducing the overall weight of the sheet metal member, and forming the sheet metal member into complex shapes.

DETAILED DESCRIPTION OF EMBODIMENTS

Embodiments of the present disclosure will be explained with reference to the drawings.

Figure 1:
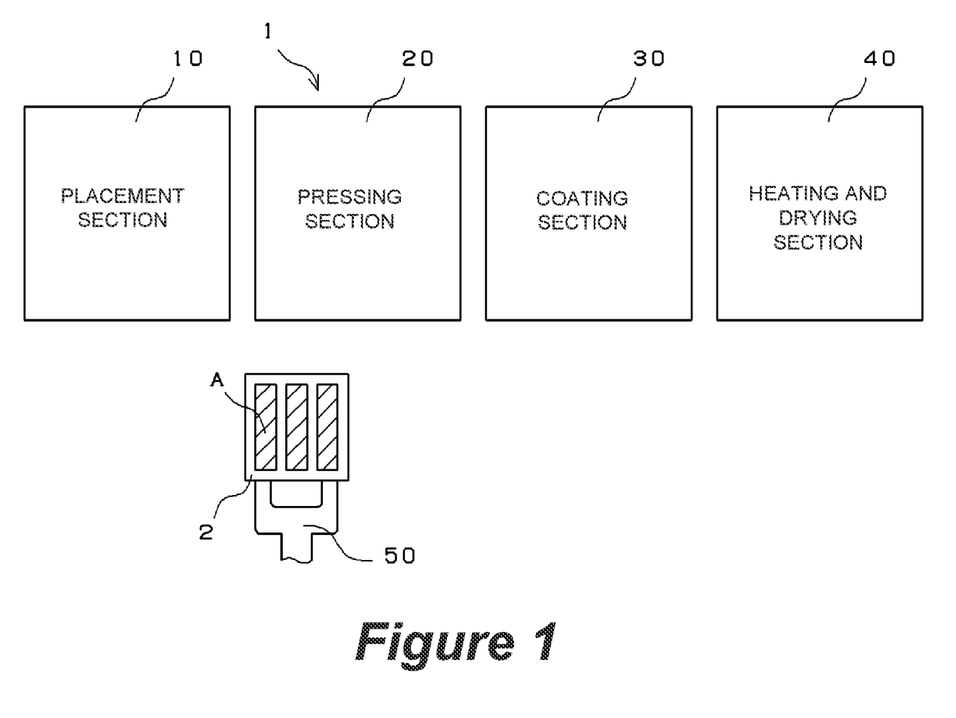
FIG. 1 is a schematic diagram illustrating the configuration of a sheet metal member forming device in accordance with an embodiment of the present disclosure.

FIG. 1 is a schematic diagram illustrating the configuration of a sheet metal member forming device in accordance with an embodiment of the present disclosure. The sheet metal member forming device 1 has a placement section 10, a pressing section 20, a coating section 30, and a heating and drying section 40, the placement section 10 places a fiber bundle on a sheet metal member 2, the pressing section 20 forms the sheet metal member 2 by pressing, the coating section 30 forms a coating film on the surface of the sheet metal member 2, and the heating and drying section 40 heats and dries the sheet metal member 2. The transfer of the sheet metal member 2 between the placement section 10, the pressing section 20, the coating section 30, and the heating and drying section 40 is performed by a transfer robot 50 or manually. In this description, "placing the fiber bundle" indicates temporarily fixing the fiber bundle to the sheet metal member 2 to the extent that the fiber bundle does not peel off or move from the sheet metal member 2 before the heating and drying section 40 heats and dries the sheet metal member 2.

Figure 2A:
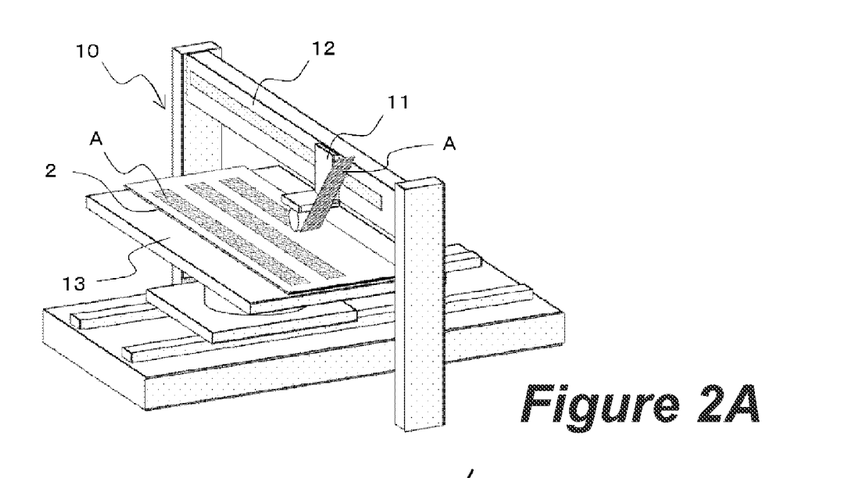
FIGS. 2A and 2B are schematic diagrams illustrating a placement section of the sheet metal member forming device in accordance with the embodiment, FIG. 2A being a diagram illustrating the overall configuration of the placement section, and FIG. 2B being a diagram illustrating the configuration of a head unit.

The configuration of the placement section 10 is illustrated in FIG. 2A. The placement section 10 has a head unit 11, and the head unit 11 presses a fiber bundle A onto the sheet metal member 2, thereby placing the fiber bundle A on the surface of the sheet metal member 2. The head unit 11 is provided on a traveling axle of a gantry 12 having the traveling axle that moves linearly in one direction, and the traveling axle operates to form a state in which the head unit 11 moves relative to the sheet metal member 2 in a predetermined direction while pressing the fiber bundle A against the surface of the sheet metal member 2 placed on the work table 13. As a result, the tape-like fiber bundle A is attached to the sheet metal member 2. In this embodiment, the work table 13 is also provided on a traveling axle, and a traveling direction of the traveling axle that moves the head unit 11 and a traveling direction of the traveling axle that moves the work table 13 are perpendicular to each other.

Here, in the present disclosure, the tape-like fiber bundle A includes a bundle of carbon fibers having a width of about 20 to 30 mm, a length of about 2000 mm, and a thickness of about 200 to 300 um. This fiber bundle A is pre-impregnated with a thermosetting resin such as epoxy, and the fiber bundle impregnated with the resin is also generally referred to as a prepreg tape or the like. This impregnated thermosetting resin before thermosetting serves as an adhesive material, and the fiber bundle A is placed on the surface of the sheet metal member 2 via the thermosetting resin.

The sheet metal member 2 is, in this embodiment, a thin metal plate for automotive applications, and can be subject to a press forming by the pressing section 20 described below. In FIG. 2A, the sheet metal member 2 on the work table 13 is a flat plate, but it can have a three-dimensional shape after press forming as described below.

Figure 2B:
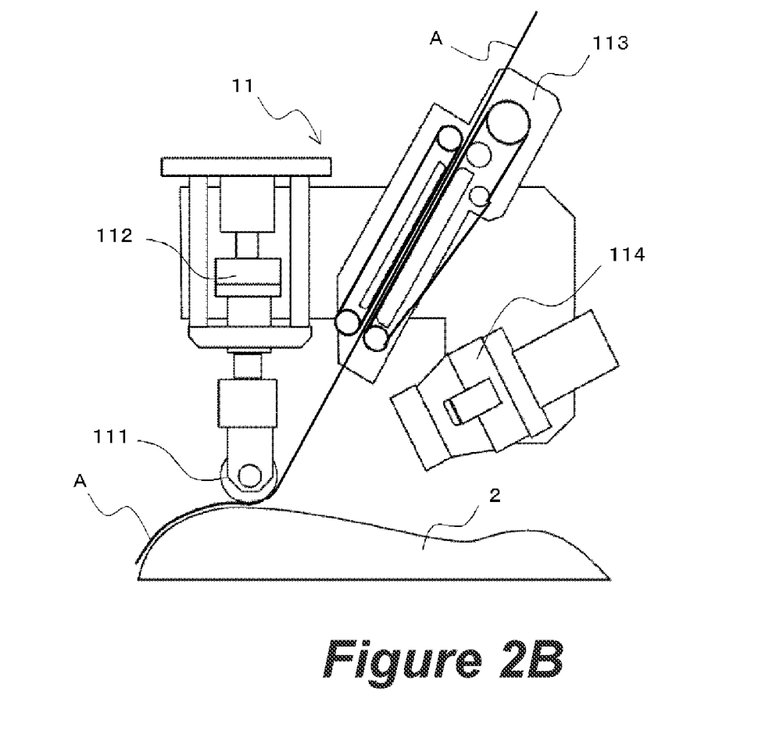

FIG. 2B illustrates the configuration of the head unit 11. The head unit 11 has a pressure roller 111 at its distal end, a pressure member 112 that presses the sheet metal member 2 via the fiber bundle A, and a feeder 113 that feeds the fiber bundle A received from a fiber bundle supply means, not shown, between the pressure roller 111 and the sheet metal member 2.

During the operation in which the head unit 11 places the fiber bundle A on the sheet metal member 2, the feeder 113 feeds the fiber bundle A between the pressure roller 111 and the sheet metal member 2 at a feeding speed equivalent to a moving speed of the entire head unit 11 by the traveling axle of the gantry 12. During this process, the pressure roller 111 is pressed in a direction toward the sheet metal member 2 by the pressure member 112 and attaches the tape-like fiber bundle A to the sheet metal member 2 while rolling.

In this embodiment, the head unit 11 has a heater 114 and heats at least one of the fiber bundle A and a placement location of the fiber bundle on the sheet metal member 2 to a temperature below a curing temperature of the thermosetting resin impregnating the fiber bundle A. In this way, the thermosetting resin is softened and the rigidity of the fiber bundle A is reduced to make it easier for the fiber bundle A to conform with the surface shape of the sheet metal member 2. For this heater 114, a known mechanism such as a hot air blowing method or a radiation light source such as a laser or an IR lamp can be used, and these conventional mechanisms can be used in combination.

Figure 3A:
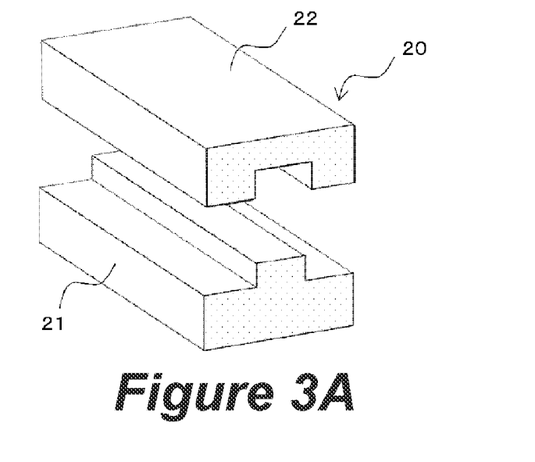
FIGS. 3A and 3B are schematic diagram illustrating a pressing section of the sheet metal member forming device in accordance with the embodiment, FIG. 3A being a diagram illustrating the overall configuration of the pressing section, and FIG. 3B being a diagram illustrating a press processing operation by the pressing section.

FIG. 3A illustrates the configuration of the pressing section 20. The pressing section 20 can utilize a press mechanism of a known configuration. In this embodiment, the pressing section 20 includes a die 21 and a die 22, and a formed object is formed into a shape that is in line with the shapes of the opposing surfaces of the die 21 and the die 22, respectively, by sandwiching the formed object therebetween and butting the die 21 and the die 22 against each other.

Figure 3B:
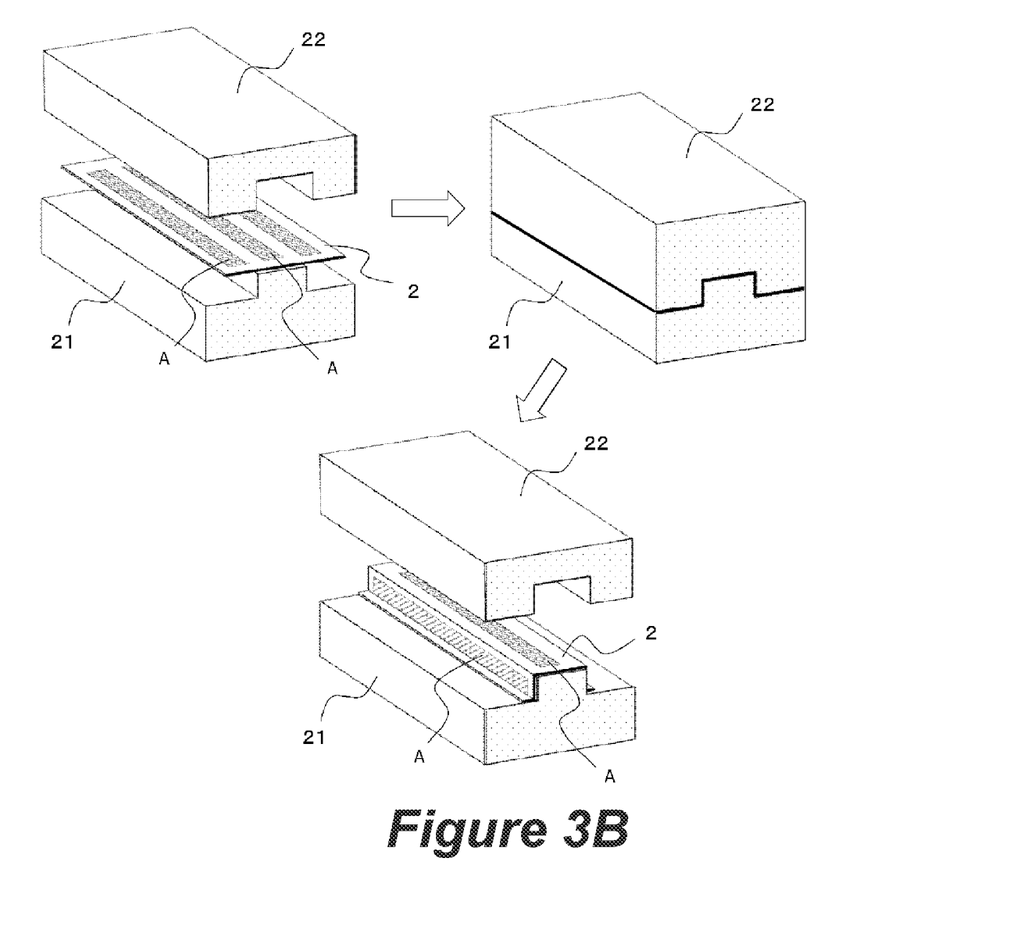

FIG. 3B is a diagram illustrating a press processing operation by the pressing section 20. The sheet metal member 2 is formed into a desired shape by sandwiching the sheet metal member 2 on which the fiber bundle A is placed, as a formed object, between the die 21 and the die 22 and butting them against each other. Here, in this embodiment, the fiber bundle A is placed in a non-deformed area in the press forming as shown in FIG. 3B. The non-deformed area in this description is a region of the sheet metal member other than a deformed area (e.g., a bent portion), which is a region stretched or contracted in an in-plane direction in the press forming. Since the fiber bundle A made of carbon fibers hardly expands or contracts, there is a risk of the fiber bundle A peeling off when the sheet metal member 2 expands or contracts in the deformed area by the press forming while the fiber bundle A is placed in the deformed area. Therefore, it is preferable that the fiber bundle A is placed in the non-deformed area.

Figure 4:
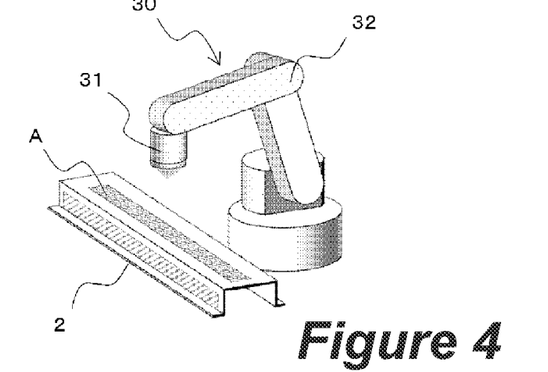
FIG. 4 is a schematic diagram illustrating a coating section of the sheet metal member forming device in accordance with the embodiment.

FIG. 4 illustrates the configuration of the coating section 30. For the coating section 30, a coating mechanism of known configuration can be utilized. In this embodiment, the coating section 30 employs a spray method, has an articulated robot 32 having a nozzle 31 at a distal end portion, and sprays coating material from the nozzle 31 anywhere on the sheet metal member 2 that has been disposed in the vicinity of the articulated robot 32 to form a coating film such as an anti-corrosion film. Note that the coating method by the coating section 30 is not limited to the spray method, but can be a method, such as electrodeposition coating in which dipping is performed, for example. Also, as shown in FIG. 4, when the fiber bundle A is placed on the sheet metal member 2, the coating section 30 can perform coating on the surface of the fiber bundle A.

Figure 5:
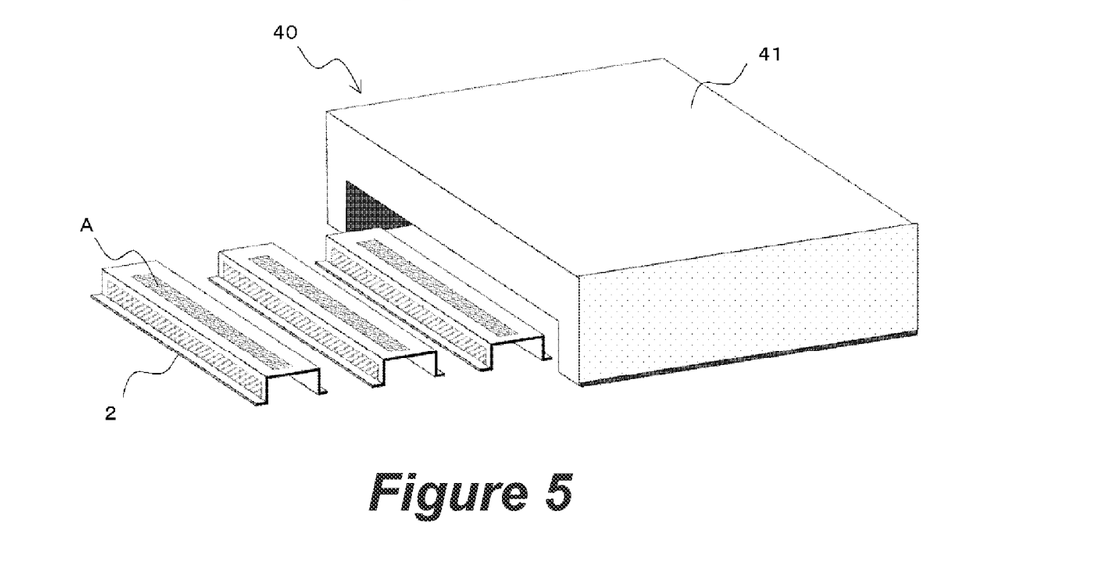
FIG. 5 is a schematic diagram of a heating and drying section of the sheet metal member forming device.

FIG. 5 illustrates the configuration of the heating and drying section 40. The heating and drying section 40 has a drying oven 41, and heats the sheet metal member 2 placed inside the drying oven 41. The sheet metal member 2 is conveyed to the interior of the drying oven 41 by a conveyor or the like which is not shown in the drawings. By this heating and drying section 40, the thermosetting resin bonding the sheet metal member 2 and the fiber bundle A is heated to a temperature above the curing temperature and cured. In addition, the coating film coated to the sheet metal member 2 is dried.

Here, if there is a risk of the fiber bundle A peeling off from the sheet metal member 2 due to warping of the fiber bundle A or the like during heating of the sheet metal member 2, the heating and drying section 40 can carry out autoclaving as well as heating as necessary. That is, the sheet metal member 2 can be bagged and the interior can be depressurized, and the heating can be performed after making the surrounding environment of the sheet metal member 2 a depressurized environment.

Figure 6:
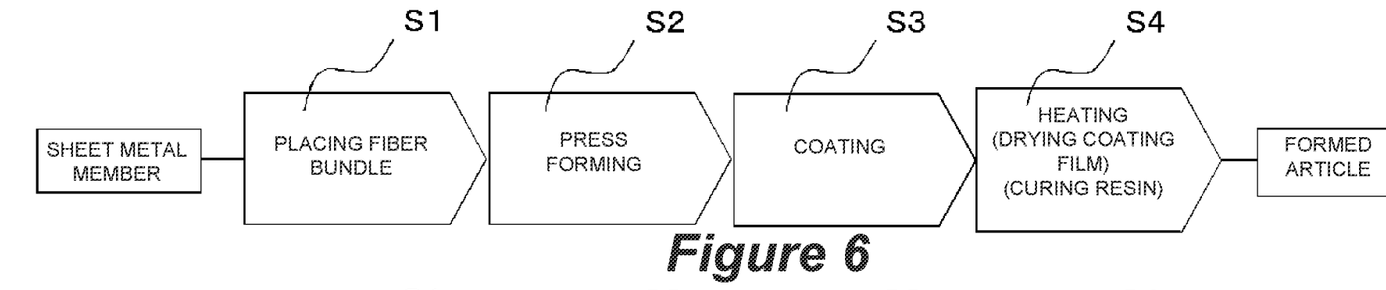
FIG. 6 is an operation flow of a sheet metal member forming method in accordance with an embodiment of the present disclosure.

Next, FIG. 6 illustrates an operation flow of the sheet metal member forming method performed by the sheet metal member forming device 1 of this embodiment.

First, in the placement section 10, the fiber bundle A is placed on the sheet metal member 2 (step S1). This process of placing the fiber bundle A on the sheet metal member 2 is referred to as a placement process in this description.

Next, a press forming is performed by the pressing section 20 to form the sheet metal member 2 on which the fiber bundle A is placed into a desired shape (step S2). This process of deforming the sheet metal member 2 by the press forming is referred to as a pressing process in this description.

Next, coating is performed by the coating section 30 on the sheet metal member 2 on which the fiber bundle A is placed to form the coating film (step S3). This process of coating the sheet metal member 2 on which the fiber bundle A is placed is referred to as a coating process in this description.

Finally, the sheet metal member 2 on which the fiber bundle A is placed and the coating film is formed is heated by the heating and drying section 40 to cure the thermosetting resin and to dry the coating film, thereby completing the forming of the sheet metal member 2 (step S4). This process of heating the sheet metal member 2 on which the fiber bundle A is placed and the coating film is formed, curing the thermosetting resin, and drying the coating film is referred to as a heating and drying process in this description.

As described above, with the sheet metal member forming method of the present embodiment, the heat-curing of the thermosetting resin that bonds the sheet metal member 2 and the fiber bundle A and the drying of the coating film are simultaneously performed in the heating and drying process. Therefore, compared with the case where the heat-curing of the thermosetting resin and the drying of the coating film are performed in separate processes, the process can be simplified and the efficiency can be improved so as to withstand mass production of automobile parts.

In the present embodiment, the pressing process is performed after the placement process. For example, when the sheet metal member 2 after press forming has a recess, it is difficult for the head unit 11 as shown in FIG. 2B to enter the inner surface of the recess to attach the fiber bundle A thereto, but by placing the fiber bundle A before performing the press forming as in this embodiment, the fiber bundle A can be easily placed.

Figure 7:
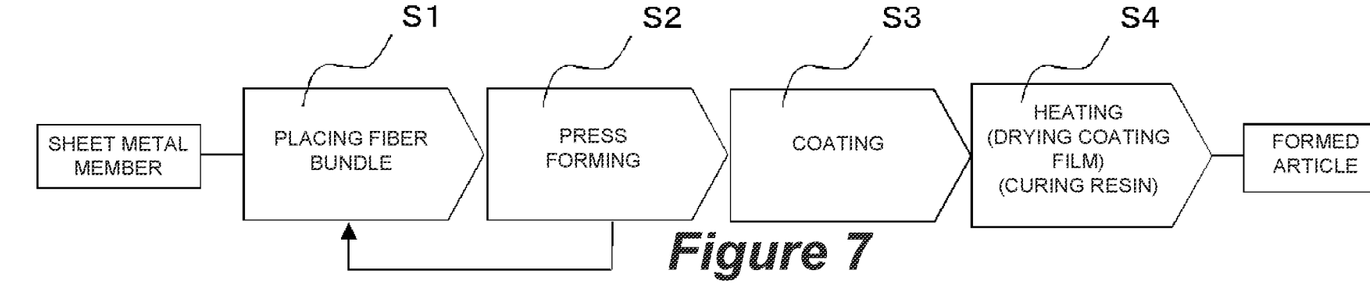
FIG. 7 is an operation flow of a sheet metal member forming method in accordance with another embodiment of the present disclosure.

Next, FIG. 7 illustrates an operation flow of a sheet metal member forming method in another embodiment of the present disclosure. In this embodiment, unlike the embodiment illustrated in FIG. 6, the attachment of the fiber bundle A to the sheet metal member 2 that has been press formed is performed by returning to the placement process after executing the pressing process. In other words, the placement process and the subsequent pressing process are repeated a plurality of times. In other words, the so-called multi-stage pressing is performed sequentially, and the fiber bundle A is placed each time. Note that the operation of returning to the placement process after the pressing process can be performed not only once but also a plurality of times.

By repeating the placement process and the subsequent pressing process a plurality of times, it is possible to form the sheet metal member 2 having a complex shape while reducing or easing warpage after pressing. Also, although it is difficult to press the head unit 11 as shown in FIG. 2B against the surface of the sheet metal member 2 having a complex shape, the placement of the fiber bundle A can be facilitated by performing the placement process before the shape becomes complicated.

Figure 8:
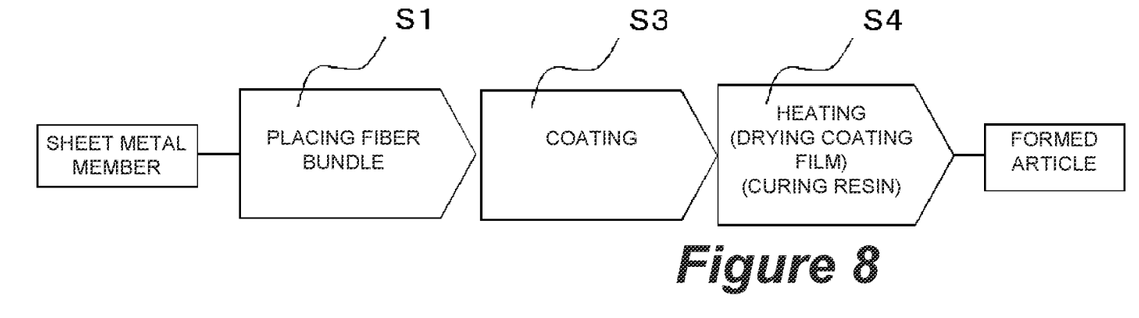
FIG. 8 is an operation flow of a sheet metal member forming method in accordance with another embodiment of the present disclosure.

Next, FIG. 8 illustrates an operation flow of a sheet metal member forming method in yet another embodiment of the present disclosure. In this embodiment, unlike the embodiment illustrated in FIG. 6, there is no pressing process, and the coating process is performed immediately after the fiber bundle A is placed on the sheet metal member 2 by the placement process. In this case, the three-dimensional forming of the sheet metal member 2 is completed at the initial point in time when it is conveyed to the sheet metal member forming device. Thus, the sheet metal member 2 conveyed to the sheet metal member forming device can have a three-dimensionally formed shape at the initial point in time.

The sheet metal member forming method and the sheet metal member forming device described above are capable of efficiently reinforcing the sheet metal member, reducing the overall weight of the sheet metal member, and forming the sheet metal member into complex shapes.

The sheet metal member forming method and the sheet metal member forming device of the present disclosure are not limited to the embodiment described above, and can take other forms within the scope of the present disclosure. For example, the fiber bundle is not limited to carbon fiber, but can be, for example, glass fiber.

In attaching the fiber bundle to the sheet metal member, the thermosetting resin impregnated in the fiber bundle serves as an adhesive material for the attachment in the above description, but it is not limited to this. For example, the thermosetting resin can be separately supplied first as an adhesive material on the surface of the sheet material member, and the fiber bundle can be placed thereon. In this case, the fiber bundle placed on the thermosetting resin serving as the adhesive material may be impregnated with the thermosetting resin, or may not be impregnated. In addition, in order to increase the strength of an adhesive layer itself, which is the adhesive material after curing, carbon fibers, glass fibers, or the like of sufficiently shorter length than the fiber bundle A of about several um length can be kneaded into the thermosetting resin which is the adhesive material as a filler.

Figure 9:
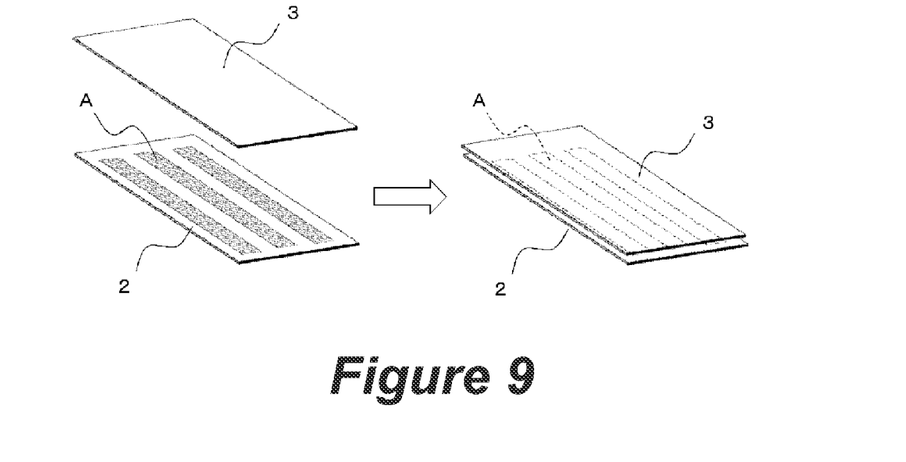
FIG. 9 is a schematic diagram illustrating a sheet metal member in accordance with another embodiment of the present disclosure.

Also, as shown in FIG. 9, a second sheet metal member 3 can be superimposed on the sheet metal member 2 on which the fiber bundle A is placed so as to sandwich the fiber bundle A. Since, by sandwiching the fiber bundle A between the two sheet metal members, the fiber bundle can be prevented from peeling off during the heat-curing of the thermosetting resin and the bagging is no longer necessary, the forming of the sheet metal member can be performed more efficiently. Note that the pressing process and the coating process can be performed on a sheet metal member in the form in which the fiber bundle A is sandwiched between two sheet metal members in this manner.

Note that part of the present disclosure is also applicable when the resin impregnating the fiber bundle is a thermoplastic resin. Specifically, by performing the pressing process after the placement process, and by repeating the placement process and the pressing process to perform a multi-stage pressing process, it is possible to facilitate placement of the fiber bundle on the inner surface of the recess and placement of the fiber bundle on a sheet metal member of complex shape.

The invention claimed is:

1. A sheet metal member forming method, comprising:
   placing a fiber bundle of a predetermined length, via a thermosetting resin, in a predetermined position on a surface of a sheet metal member;
   forming a coating film on at least a part of the sheet metal member after the placing of the fiber bundle; and
   while heating and drying the coating film, heat-curing the thermosetting resin to bond the fiber bundle to the sheet metal member.

2. The sheet metal member forming method according to claim 1, wherein
   at least a part of the thermosetting resin is pre-impregnated in the fiber bundle.

3. The sheet metal member forming method according to claim 1, wherein
   at least a part of the thermosetting resin is separately supplied as an adhesive material.

4. The sheet metal member forming method according to claim 1, further comprising
   between the placing of the fiber bundle and the forming of the coating film, performing a press forming of the sheet metal member on which the fiber bundle is placed subsequent to the placing of the fiber bundle.

5. The sheet metal member forming method according to claim 4, wherein
   the placing of the fiber bundle and the performing of the press forming of the sheet metal member subsequent to the placing of the fiber bundle are repeated a plurality of times to sequentially perform the press forming of the sheet metal member.

6. The sheet metal member forming method according to claim 4, wherein
   the predetermined position is located in a non-deformed area of the surface of the sheet metal member that is not deformed in the press forming of the sheet metal member.

7. The sheet metal member forming method according to claim 1, wherein
   before the heating and drying of the coating film, a second sheet metal member is superimposed on the sheet metal member on which the fiber bundle is placed so as to sandwich the fiber bundle.

8. The sheet metal member forming method according to claim 1, wherein
   at least one of the fiber bundle and the sheet metal member at least in the vicinity of the predetermined position is heated to a temperature below a curing temperature of the thermosetting resin during the placing of the fiber bundle.

9. The sheet metal member forming method according to claim 1, wherein
   the fiber bundle includes carbon fibers.

10. The sheet metal member forming method according to claim 3, wherein
    the adhesive material includes carbon fibers.

11. A sheet metal forming device configured to perform the sheet metal member forming method according to claim 1.

12. The sheet metal member forming method according to claim 1, wherein
    the placing of the fiber bundle includes placing the fiber bundle on the surface of the sheet metal member using a head that is configured to feed the fiber bundle while moving relative to the surface of the sheet metal member.

13. The sheet metal member forming method according to claim 12, wherein
    the head has a pressure roller that is configured to press the fiber bundle against the surface of the sheet metal member during the placing of the fiber bundle.

14. The sheet metal member forming method according to claim 12, wherein
    the head has a heater that is configured to heat at least one of the fiber bundle and the sheet metal member at least in the vicinity of the predetermined position to a temperature below a curing temperature of the thermosetting resin during the placing of the fiber bundle.

15. The sheet metal member forming method according to claim 1, wherein
    the heating and drying of the coating film and the heat-curing of the thermosetting resin are simultaneously performed.

16. The sheet metal member forming method according to claim 15 wherein
the heating and drying of the coating film and the heat-curing of the thermosetting resin are performed by heating the sheet metal member on which the fiber bundle is placed to a temperature above a curing temperature of the thermosetting resin.

17. The sheet metal member forming method according to claim 1, wherein
the forming of the coating film occurs immediately after the placing of the fiber bundle.

18. The sheet metal member forming method according to claim 2, wherein
the part of the thermosetting resin is pre-impregnated in the fiber bundle prior to the placing of the fiber bundle.

19. The sheet metal member forming method according to claim 2, wherein
the part of the thermosetting resin is pre-impregnated in the fiber bundle during the placing of the fiber bundle.

20. The sheet metal member forming method according to claim 3, wherein
the part of the thermosetting resin is supplied on the surface of the sheet metal member prior to the placing of the fiber bundle.

* * * * *